Aug. 29, 1939.   M. P. BLOMBERG   2,170,791
LOCOMOTIVE FRONT END ARRANGEMENT
Filed Oct. 5, 1936   2 Sheets-Sheet 1
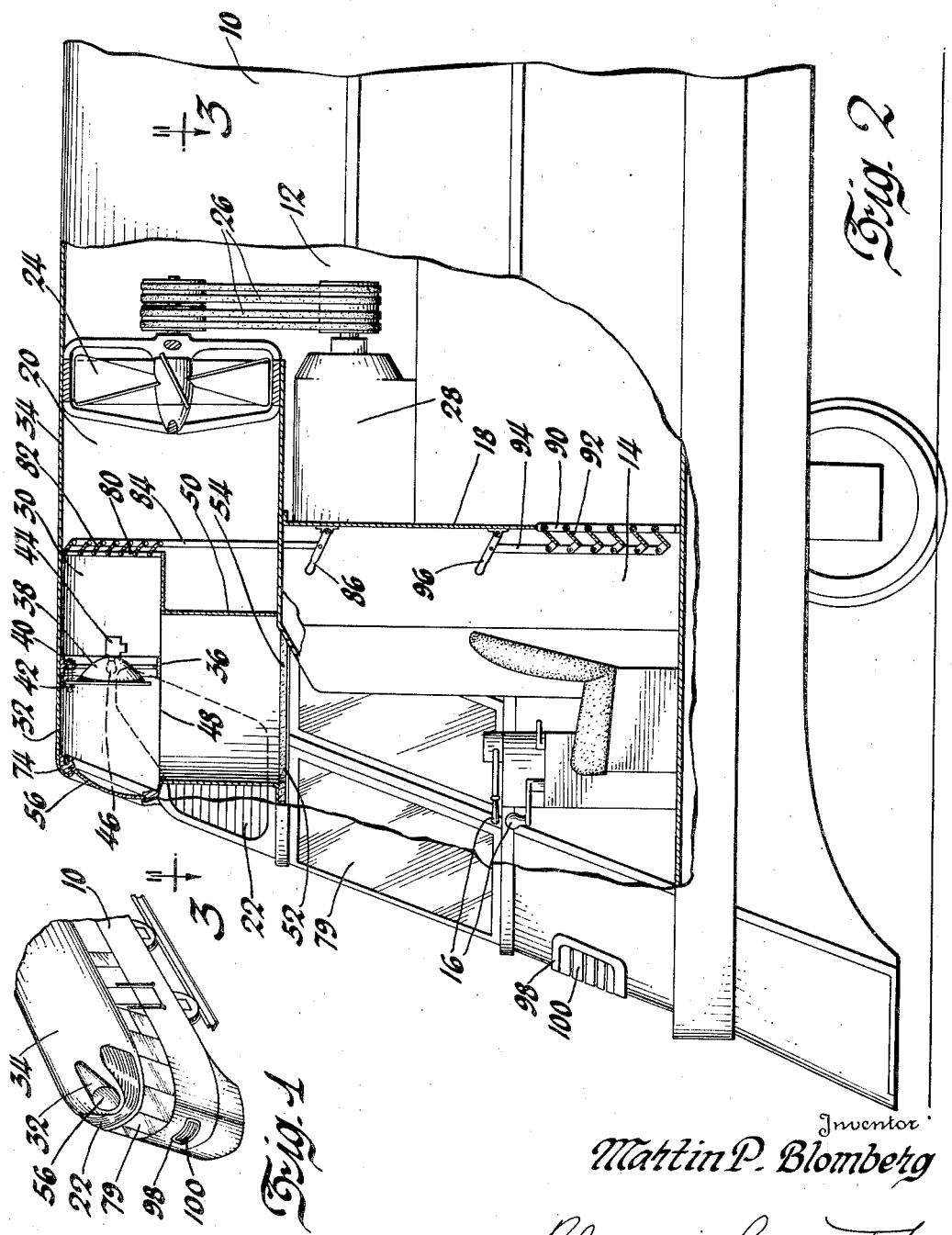
Inventor
Martin P. Blomberg
By Blackmore, Spencer & Flint
Attorneys Aug. 29, 1939.  M. P. BLOMBERG  2,170,791
LOCOMOTIVE FRONT END ARRANGEMENT
Filed Oct. 5, 1936  2 Sheets-Sheet 2

Inventor
Martin P. Blomberg
By Blackmore, Spacer & Flint
Attorneys

Patented Aug. 29, 1939

2,170,791

UNITED STATES PATENT OFFICE 2,170,791

LOCOMOTIVE FRONT END ARRANGEMENT

Martin P. Blomberg, Hinsdale, Ill., assignor to General Motors Corporation, Detroit, Mich., a corporation of Delaware Application October 5, 1936, Serial No. 103,990

2 Claims. (Cl. 105—456)

This invention relates to railway locomotives of the Diesel electric type, and is concerned particularly with the general arrangement of the front end thereof.

Ordinarily in such locomotives the headlight bulb and reflector is located within a housing which is separate from the locomotive body and which is mounted either on the top or front of the latter. In such constructions, when it is desired to replace the headlight bulb or to clean either the reflector or the lens, it is necessary to perform that task from the outside of the vehicle, which is difficult or often impossible to do when the locomotive is moving, or in bad weather.

It is therefore an object of this invention to provide an arrangement of the front end of such a locomotive which will make it possible to obtain access to the headlight from the inside of the locomotive body, so that the electric bulb may be replaced or the reflector cleaned or adjusted while the vehicle is in motion or under any weather conditions.

It is a further object to so construct the headlight that access may be had to the outside face of the glass door or lens thereof from the inside of the locomotive body, in order that it may be cleaned while the locomotive is in motion.

The foregoing objects are accomplished by locating the headlight bulb, reflector and lens in a housing portion which is built in as an integral part of the locomotive body, at the front portion of the top or roof of the body, and providing a passageway which leads from the interior of the body into the portion which serves to house the headlight. When a compartment is provided in the front part of the locomotive body for the operator, this compartment will usually be directly under the headlight, and in such cases the passageway will extend between this compartment and the headlight housing portion, thus permitting one of the operators to obtain access to the various parts of the headlight at any time without having to leave the operator's compartment.

Another object of the invention is to utilize the portion of the body which serves to house the headlight and the passageway which leads from it to the operator's compartment to provide controlled ventilation of the latter, since in the embodiment illustrated the headlight housing portion is located adjacent the duct through which the cooling air for the radiators and engines is taken into the locomotive body.

Other objects and advantages will appear in the following detailed description of the invention.

In the accompanying drawings, Fig. 1 is a small scale perspective view of the front end of a Diesel electric locomotive embodying my invention.

Fig. 2 is a longitudinal vertical sectional view, on a larger scale, through the forward portion of such a locomotive, showing my improved front end arrangement.

Figure 3:
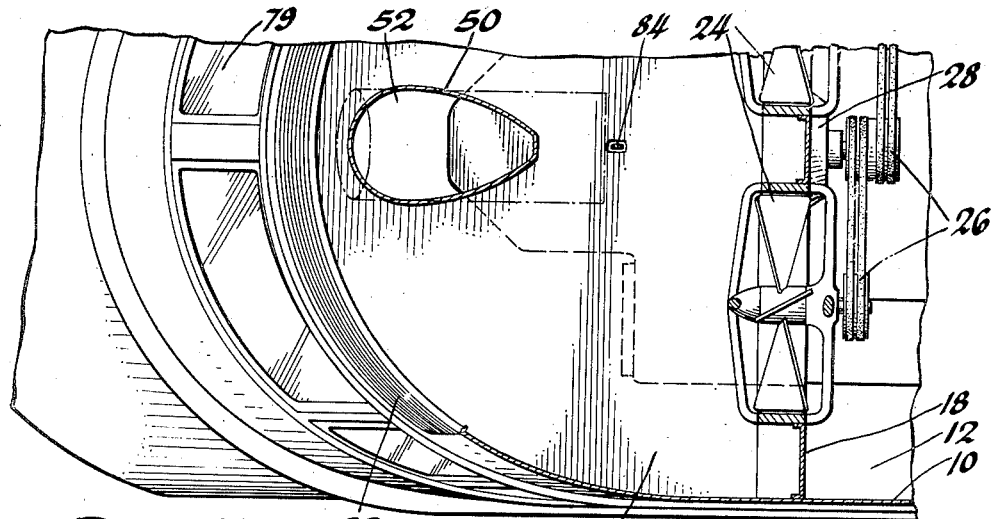
Fig. 3 is a sectional view taken on the line 3—3 of Fig. 2.

The reference numeral 10 indicates the body of a locomotive of the Diesel electric type, and 12 is an engine compartment within which is located the power plant equipment and the accessories therefor. 14 is an operator's compartment within which the apparatus 16 for controlling the operation of the locomotive is located. A partition 18 separates the engine and operator compartments. Located above the operator's compartment is an air duct 20 which extends from the open grill 22 at the front of the locomotive back into the engine compartment, and a pair of fans 24 supported in the rearward end of the duct serve to draw air in through the grill and discharge it into the engine compartment. The fans 24 are driven by belts 26 or in any other suitable manner from some part of the power plant equipment, such as the auxiliary generator 28.

Instead of locating the headlight in a housing separate from the locomotive body, and supporting that housing on the front or roof of the locomotive as is usually done, I prefer to build the housing for the headlight within the locomotive body, at the front of the roof portion thereof. In the embodiment of the invention illustrated in the drawings, because of the presence of the air duct 20 at the upper part of the front end of the locomotive body, the headlight housing portion 30 is built into the upper part of the air duct at the forward end thereof, an extension 32 of the top 34 of the locomotive body serving to form the upper part of the headlight housing portion.

Secured within the latter is a support 36 on which the headlight reflector 38 is adjustably supported by bolts 40 and adjusting screws 42, and a socket 44 secured to the reflector serves to support the light bulb 46 in proper position inside of the reflector. An opening 48 is formed in the bottom wall of the headlight housing portion, and a tubular member 50 leads from this opening to an opening 52 of corresponding size and shape formed in the top wall 54 of the operator's compartment. The opening 48 may be of the same size and shape as the cross-sectional shape of the tubular member, in which case it will extend both in front of and behind the reflector, or it may be made smaller so that it will be wholly in front of the reflector, in which case a second opening will be provided in the bottom wall of the headlight housing immediately behind the reflector, so that there may be communication between the tubular member and the space in the headlight housing portion behind the reflector. As shown in Fig. 3, since the tubular member 50 is located in the air duct 20, it is formed of streamlined shape in cross section in order that it may offer the minimum resistance to the flow of air past it.

The tubular member 50 is made sufficiently large in cross-sectional dimensions to permit the upper part of a man's body to enter it, and it will be seen therefore that access may be had to the inside of the headlight housing portion from the operator compartment, thus permitting replacement of the headlight bulb, or cleaning or adjustment of the reflector from the inside of the locomotive while the latter is in motion or under any weather conditions.

The front of the headlight housing portion is closed by a lens or glass 56 which is clamped against a frame 58 by means of a ring 60 which may be drawn toward the frame by screws 62 threaded into the latter, there being suitable packings 64 and 66 interposed between the glass and the frame and ring. At its upper portion, the frame 58 is pivotally connected as at 68 with a support 70 which is fixedly secured by bolts 72 to a member 74 which is fastened in any suitable manner inside the shell of the headlight housing portion. A gasket 76 of resilient material is mounted in the member 74 and the ring 60 may be drawn tightly against this gasket to seal the opening at the front of the headlight housing portion by tightening the wing nut 78 which is threaded into the member 74.

Figure 4:
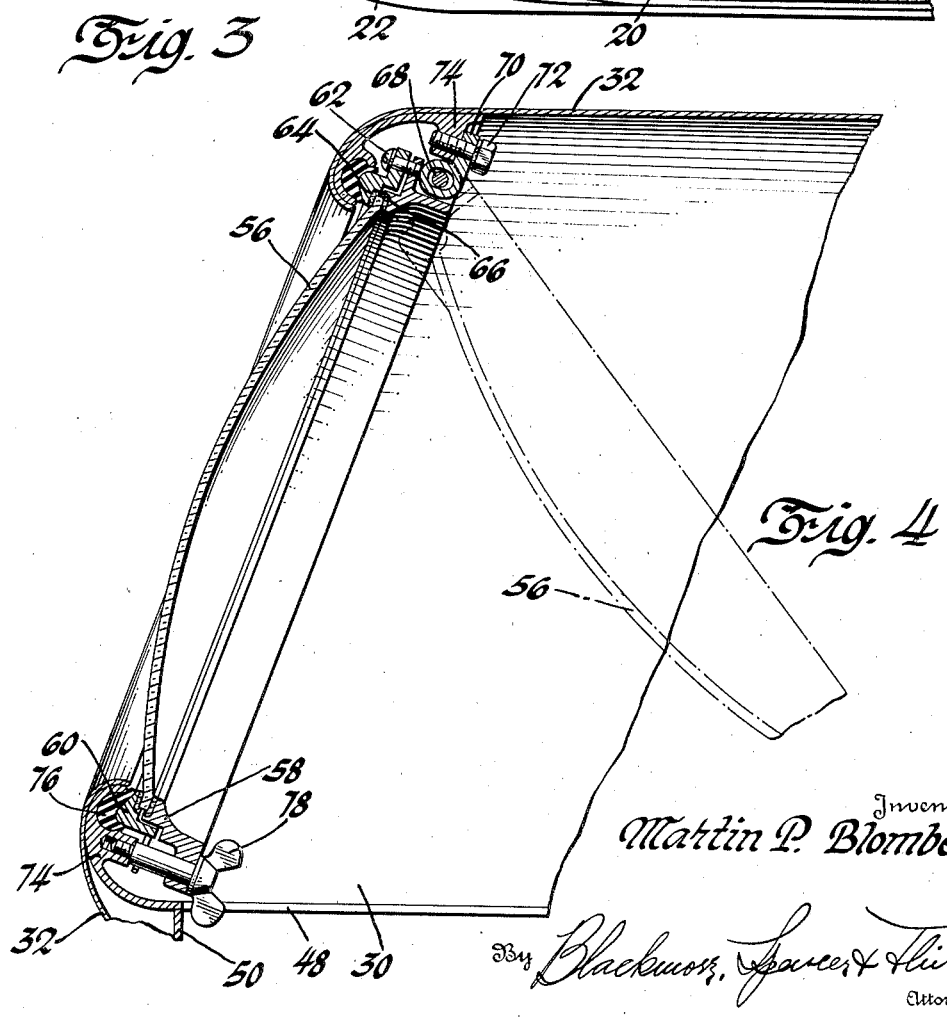
Fig. 4 is a fragmentary sectional view, on a still larger scale, through the front end of the headlight housing portion, showing the construction of the door in which the headlight glass or lens is mounted.

When it is desired to clean the outside of the lens or glass 56, by reaching up through the tubular member 50, the wing nut 78 may be loosened and the frame 58 may be swung inwardly, as indicated by the dash and dot lines in Fig. 4, thereby making it possible to clean the outside of the lens or glass from the inside of the locomotive.

Locomotives of this type travel at such high speed that it is not considered desirable to open the windows 79 in the operator compartment to ventilate the latter, therefore, some other means must be provided to do this. In the front end arrangement described above, since the headlight housing portion is located in the duct 20 through which air is being drawn into the engine compartment, and since it is connected with the operator compartment by the tubular member 50, I have found that this structure may be utilized to provide a means for ventilating the operator compartment.

This may be accomplished by providing an opening 80 in the rear wall of the headlight housing portion, which opening may have mounted in it an adjustable shutter 82, the position of which may be controlled by a rod 84 which extends downwardly through the top wall of the operator compartment and has connected to its lower end an operating lever 86. An opening 90 is formed in the lower part of the partition 18 which separates the operator compartment from the engine compartment, and an adjustable shutter 92, the operation of which is controlled by a rod 94 and a lever 96, is mounted in this opening.

It will be seen that since due to the suction effect of the fans there is a condition of lower than atmospheric pressure existing in the duct 20, when the shutter 82 is moved to open position, air will be withdrawn from the headlight housing portion and through the tubular member 50 from the operator compartment. By moving the shutter 92 to open position, a supply of air may be drawn into the operator compartment from the engine compartment to replace that drawn out by the fans. It will be obvious that by adjusting the shutter 82 to different positions, the amount of air which will be drawn out of the operator compartment may be varied, and by regulating the position of the shutter 92, the amount of air which will be drawn into the operator compartment from the engine compartment may be controlled, so that any desired condition of ventilation may be obtained.

If desired, a register 98, having an adjustable shutter 100 associated with it, may be located in the front or side walls of the operator compartment so that under certain conditions some or all of the air being supplied to the operator compartment may be taken in from outside. For example, in extremely hot weather, it might be found to be undesirable to take the air for the operator compartment from the engine compartment, because the air in the latter might be too warm. In such case, the shutter 92 could be closed, and the shutter 100 opened, so that all of the air being drawn into the operator compartment would come from outside the locomotive body. In cold weather, it probably would be found desirable to close the shutter 100 and open the shutter 92 so that all of the air being drawn into the operator compartment would be taken from the engine compartment, or of course, both shutters 92 and 100 could be partly opened so that some of the air being drawn into the operator compartment would be taken from the engine compartment and some would be taken from outside the locomotive body, and obviously by adjusting these two shutters to different positions, the relative proportions of the air so taken into the operator compartment may be varied.

While I have shown and described a specific embodiment of my invention, it will be understood that various changes in details of design and arrangement may be made without departing from the spirit and scope of the appended claims.

I claim:

1. In combination with a locomotive body having an opening formed in one of its walls, a headlight housing having an opening formed in the front face thereof, a lens for covering said opening, said lens being adapted to be swung inwardly into said housing, said housing having a second opening formed in its bottom wall, and a tubular member forming a passageway between the opening in said body and the opening in the bottom wall of said housing whereby access may be had to the exterior of the lens from the inside of the locomotive body.

2. In combination with a locomotive body having a compartment located therein, said compartment having an opening formed in one of the walls thereof, a headlight housing located within the body and having an opening formed in one of its walls, and a tubular member leading from the opening in the compartment wall to the opening in the housing wall, whereby access may be had from the compartment through the tubular member to the interior of the headlight housing.

MARTIN P. BLOMBERG.